United States Patent
Han et al.

(10) Patent No.: US 8,815,431 B2
(45) Date of Patent: Aug. 26, 2014

(54) BATTERY MODULE UNIT AND BATTERY MODULE PACKAGE

(75) Inventors: Jung-Yup Han, Yongin-si (KR); No-Hyun Kwak, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 886 days.

(21) Appl. No.: 12/957,279

(22) Filed: Nov. 30, 2010

(65) Prior Publication Data
US 2011/0143180 A1  Jun. 16, 2011

(30) Foreign Application Priority Data
Dec. 11, 2009  (KR) .................. 10-2009-0123371

(51) Int. Cl.
*H01M 2/24* (2006.01)
*H01M 2/26* (2006.01)
*H01M 2/28* (2006.01)
*H01M 6/42* (2006.01)

(52) U.S. Cl.
USPC .................................. 429/121; 429/158

(58) Field of Classification Search
CPC .................................................. H01M 2/202
USPC ........................................ 429/121, 179
See application file for complete search history.

(56) References Cited

U.S. PATENT DOCUMENTS

| 1,659,463 A | * | 2/1928 | Entz .................................. 429/1 |
| 4,861,288 A |   | 8/1989 | Friedman |
| 2002/0030976 A1 | * | 3/2002 | Boe .............................. 361/752 |

FOREIGN PATENT DOCUMENTS

| JP | 05-065079 | 3/1993 |
| JP | 2003-123905 | 4/2003 |
| KR | 10-0599734 | 7/2006 |

OTHER PUBLICATIONS

Registration Determination Certificate dated Dec. 9, 2011, for corresponding KR Application No. 10-2009-0123371.

* cited by examiner

*Primary Examiner* — Barbara Gilliam
*Assistant Examiner* — Steven Scully
(74) *Attorney, Agent, or Firm* — Knobbe Martens Olson & Bear LLP

(57) ABSTRACT

A battery unit module and a battery module package including the battery unit module are disclosed. The battery unit module includes: a secondary battery; a unit case accommodating the secondary battery; and an electrode terminal electrically coupled to the secondary battery, the electrode terminal including a positive electrode terminal and a negative electrode terminal, and exposed outside of the unit case, wherein the positive electrode terminal and the negative electrode terminal have cross-sections that are asymmetrical with respect to each other, and wherein a securing means is formed on at least one of the positive electrode terminal and the negative electrode terminal.

19 Claims, 13 Drawing Sheets

BATTERY MODULE UNIT AND BATTERY MODULE PACKAGE

RELATED APPLICATION

This application claims the benefit of Korean Patent Application No. 10-2009-0123371, filed on Dec. 11, 2009, in the Korean Intellectual Property Office, the disclosure of which is incorporated herein in its entirety by reference.

BACKGROUND

1. Field

The present technology relates to a battery unit module and a battery module package including the battery unit module, and more particularly, to electrode terminals of a battery unit module and a battery module pack including the battery unit module.

2. Description of the Related Technology

In general, uninterruptible power supply (UPS) devices supply power in an uninterruptible manner to server devices which are always to be supplied power, for example, to a load of screen doors in a subway. In these UPS devices, secondary batteries are typically installed and electric power of the secondary batteries is applied to a load when a power line connected to the UPS devices is cut. In the secondary batteries, a charging voltage is typically set according to series connections between a plurality of cells, and the secondary batteries are typically charged using a floating charge method in which charging and discharging are repeatedly performed according to changes in a current flowing through the secondary batteries.

SUMMARY

One or more embodiments of the present invention include a battery unit module and a battery module package including the battery unit module, in which a positive electrode terminal and a negative electrode terminal thereof each has different cross-sections so as to prevent improper insertion of the positive electrode terminal and the negative electrode terminal when combining with an object.

Additional aspects will be set forth in part in the description which follows and, in part, will be apparent from the description, or may be learned by practice of the illustrated embodiments.

According to one or more embodiments of the present invention, a battery unit module includes: a secondary battery; a unit case accommodating the secondary battery; and an electrode terminal electrically coupled to the secondary battery, the electrode terminal including a positive electrode terminal and a negative electrode terminal, and exposed outside of the unit case by penetrating the unit case, wherein the positive electrode terminal and the negative electrode terminal have cross-sections that are asymmetrical with respect to each other, and wherein a securing means is formed on at least one of the positive electrode terminal and the negative electrode terminal.

According to an embodiment, the battery unit module may further include a bus bar including a hole coupled to one end of the electrode terminal.

According to an embodiment, at least one of the positive electrode terminal and the negative electrode terminal may include: a connection member electrically coupled to the secondary battery and penetrating the unit case; a contact member formed on one side of the connection member configured so that at least part of one surface of the contact member contacts the bus bar; a modeling member formed on one side of the contact member and having a cross-section different from the cross-section of the other terminal; and a joint member formed on one side of the modeling member, the joint member configured to penetrate through the hole of the bus bar and to connect with a nut, the joint member having a cross-section different from the cross-section of the other terminal, wherein the securing means comprises a screw thread, and wherein the screw thread is formed on at least one of an outer surface of the modeling member and an outer surface of the joint member.

According to an embodiment, the hole of the bus bar may have a form corresponding to the cross-section of the modeling member or the cross-section of the joint member.

According to an embodiment, the connection member, the contact member, the modeling member, and the joint member may be formed as one body. In at least one of the positive electrode terminal and the negative electrode terminal, the cross-section of the modeling member may be the same as the cross-section of the joint member and the screw thread may be continuously formed across the outer surface of the modeling member. The cross-section of the joint member and the cross-section of the modeling member may be asymmetrical with respect to each other. Also, the cross-section of the joint member may be circular.

A nut groove may be formed on an inside surface of the nut in correspondence to the screw thread. According to an embodiment, the nut may cover at least part of the modeling member. A space may be formed on the inside surface of the nut in correspondence to the modeling member.

The battery unit module may further include a washer including a penetration hole having a size equal to or larger than the outer surface of the modeling member or the joint member, wherein the washer may be coupled to the electrode terminal and the nut.

At least one of the positive electrode terminal and the negative electrode terminal may include: a connection member electrically connected to the secondary battery and penetrating the unit case; a contact member formed on one side of the connection member so that at least part of one surface of the contact member contacts the bus bar; and a body member formed on one side of the contact member and having a cross-section smaller than the cross-section of the contact member; wherein the securing means comprises a fixing member having a cross-section larger than the cross-sections of the body member, formed on one side of the body member, wherein the fixing member has a cross-section different from the cross section of the other terminal, and wherein the fixing member may include a controlling groove that is tapered in a longitudinal direction and that controls size of the cross-section of the fixing member.

According to an embodiment, the hole of the bus bar may have a form corresponding to the cross-section of the fixing member.

According to an embodiment, the cross-section of the hole of the bus bar may be smaller than the largest cross-section of the fixing member so that the fixing member is configured to be forcibly engaged to the hole of the bus bar. The cross-section of the hole of the bus bar may be smaller than the cross-sections of the contact member so that he bus bar is configured to be interposed between the contact member and the fixing member when the fixing member is forcibly engaged to the hole of the bus bar.

The battery unit module may be applied to an uninterruptible power supply (UPS) module unit.

According to one or more embodiments of the present invention, a battery module package includes: a plurality of battery unit modules; and a bus bar including a hole and electrically coupling the plurality of battery unit modules, wherein at least one of the battery unit module in the plurality of battery unit modules includes a secondary battery, a unit case accommodating the secondary battery, and an electrode terminal electrically coupled to the secondary battery, the electrode terminal including a positive electrode terminal and a negative electrode terminal, and exposed outside of the unit case, wherein the cross-sections of the positive electrode terminal and the negative electrode terminal are asymmetrical with respect to each other, and wherein a securing means is formed on at least one of the positive electrode terminal and the negative electrode terminal.

According to an embodiment, the battery module package may further include an object including insertion holes having cross-sections respectively corresponding to the cross-section of the positive electrode terminal and the cross-section of the negative electrode terminal, so that the electrode terminal is configured to be inserted to the object.

The battery unit module may be applied to an uninterruptible power supply (UPS) module unit.

According to embodiments of the battery unit module and the battery module package, the positive electrode terminal and the negative electrode terminal may each have different cross-sections so as to prevent improper insertion of the battery unit module when combining with an object.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Hereinafter, one or more embodiments of the present invention will be described more fully with reference to the accompanying drawings.

Figure 1:
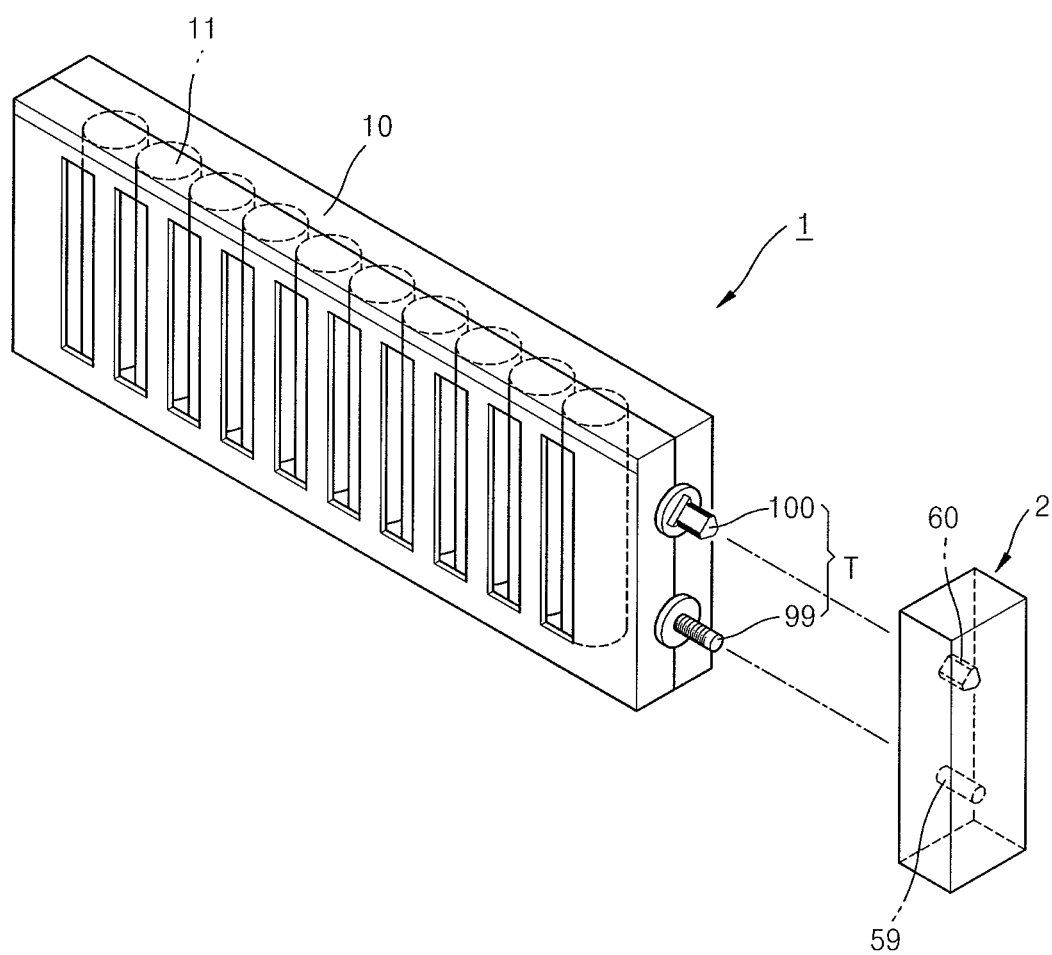
FIG. 1 is a perspective view of a battery unit module according to an embodiment of the present invention.
Figure 2:
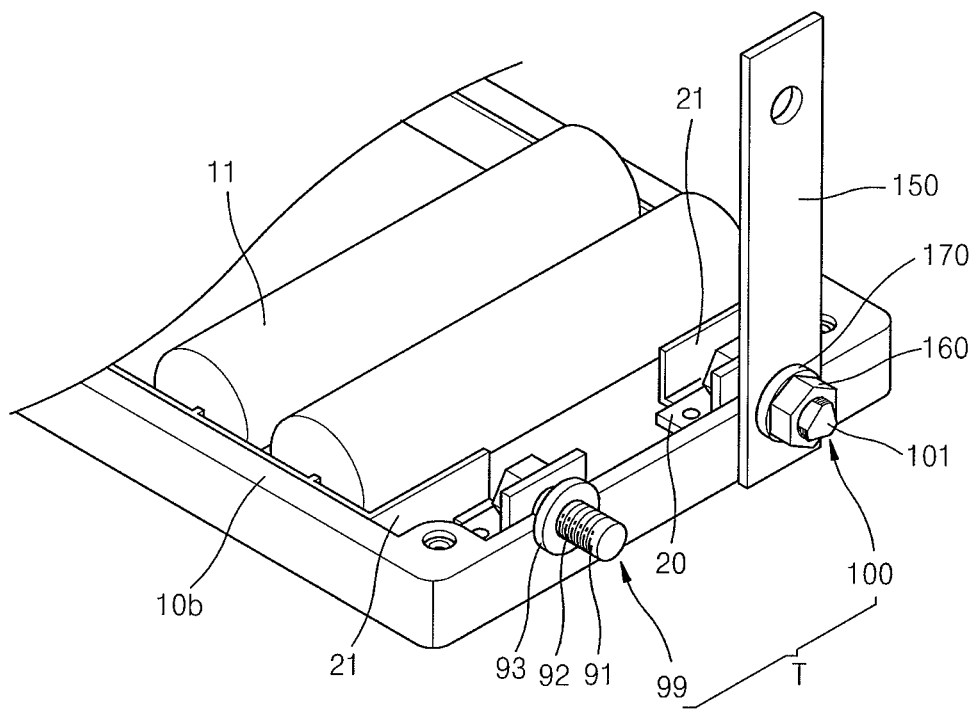
FIG. 2 is a perspective view schematically illustrating a part of the battery unit module of FIG. 1 combined to a bus bar.
Figure 3A:
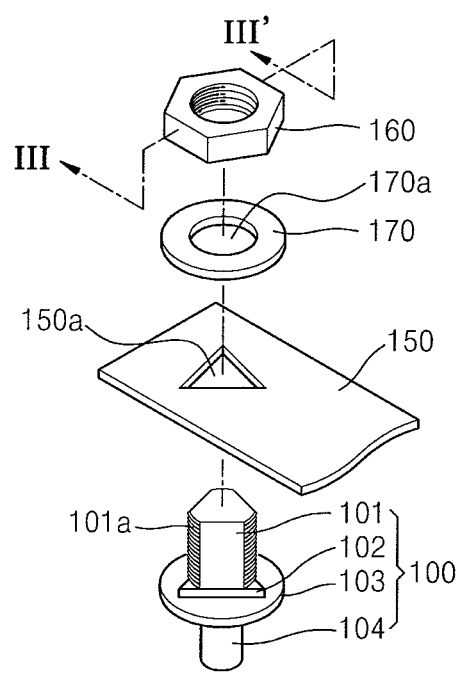
FIG. 3A is an exploded perspective view schematically illustrating a positive electrode terminal and a bus bar according to an embodiment of the present invention.
Figure 3B:
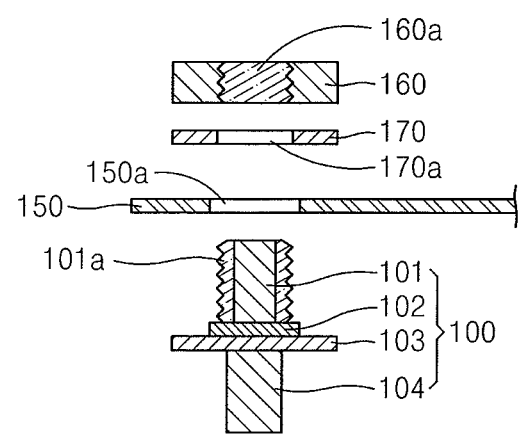
FIG. 3B is a cross-sectional view of FIG. 3A cut along a line III-III' of FIG. 3A.
Figure 3C:
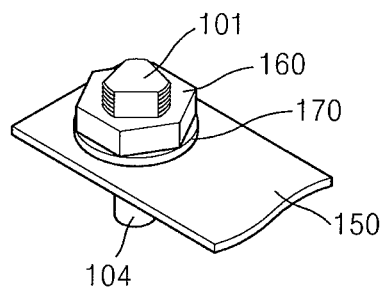
FIG. 3C is a perspective view of the positive electrode terminal and the bus bar of FIG. 3A in a combined state.

A battery unit module according to an embodiment of the present invention will be described with reference to FIGS. 1, 2, 3A, 3B, and 3C. FIG. 1 is a perspective view of a battery unit module 1 according to an embodiment of the present invention, FIG. 2 is a perspective view schematically illustrating a part of the battery unit module 1 of FIG. 1 combined to a bus bar 150, FIG. 3A is a exploded perspective view schematically illustrating a positive electrode terminal 100 and the bus bar 150 according to an embodiment of the present invention, FIG. 3B is a cross-sectional view of FIG. 3A cut along a line III-III' of FIG. 3A, and FIG. 3C is a perspective view of the positive electrode terminal 100 and the bus bar 150 of FIG. 3A in a combined state.

Referring to FIG. 1, a battery unit module 1 according to an embodiment includes a unit case 10, secondary batteries 11, and an electrode terminal T. The unit case 10 includes the secondary batteries 11 and the secondary batteries 11 are electrically connected to the electrode terminal T. The secondary batteries 11 may be electrically connected to each other in series or in parallel. Referring to FIG. 2, the secondary batteries 11 may be electrically connected to the electrode terminal T through a conductor 21 and a conducting terminal 20. The electrode terminal T can include a positive electrode terminal 100 and a negative electrode terminal 99. Referring to FIG. 1, the battery unit module 1 may be inserted into an object 2. For example, in a battery module package, a plurality of the battery unit modules 1 may be electrically connected to each other. Accordingly, the plurality of battery unit modules 1 may be inserted into the object 2 and the bus bar 150 may be connected thereto. Here, if the positive electrode terminal 100 and the negative electrode terminal 99, which are included in the electrode terminal T of the battery unit module 1, are symmetrical to each other, there is a possibility that the positive electrode terminal 100 and the negative electrode terminal 99 are improperly inserted into the object 2 due to failure to identify upper and lower sides of the battery unit module 1. If the battery unit module 1 is improperly inserted into the object 2, various problems may be caused. In this regard, cross-sections of the positive electrode terminal 100 and the negative electrode terminal 99 may be asymmetrically formed with respect to each other. For example, the cross-sections of the positive electrode terminal 100 may be triangular and the cross-sections of the negative electrode terminal 99 may be circular. For convenience of description, the cross-section of the positive electrode terminal 100 is illustrated as polygonal and the cross-section of the negative electrode terminal 99 is illustrated as circular. However, the electrode terminal T having asymmetrical cross-sections is not limited to the illustration of FIG. 1, as long as the cross-sections of the positive electrode terminal 100 and the cross-sections of the negative electrode terminal 99 are asymmetrical with respect to each other.

Also, a securing means may be formed on at least one of the positive electrode terminal and the negative electrode terminal. As shown in FIG. 3A, the securing means may be a screw thread 101a for coupling with a nut 160. Furthermore, as shown in FIG. 9A-10C, the securing means may be a fixing member 511 and 611 that would allow the electrode terminal T to be forcibly engaged to the bus bars 550 and 650 through the holes 550a and 650a. Of course, embodiments of the present invention are not limited thereto. The screw thread 101a and the fixing member 511 and 611 will be described more fully with reference to the accompanying drawings.

In the illustrated embodiment, the object 2 includes insertion holes 60 and 59 having cross-sections corresponding to the cross-sections of the positive electrode terminal 100 and of the negative electrode terminal 99, respectively, for the electrode terminal T to be inserted thereto. The cross-sections of the positive electrode terminal 100 and of the negative electrode terminal 99 are asymmetrical to each other. Thus, when it is attempted to improperly insert terminal T of battery unit module 1 into object 2, terminal T may not be inserted into object 2. Accordingly, a user may identify that the battery unit module 1 is improperly oriented with respect to object 2 and can reorient and attempt to reinsert the electrode terminal T into object 2. Accordingly, the upper and lower sides of the battery unit module 1 may be correctly distinguished.

Figure 4:
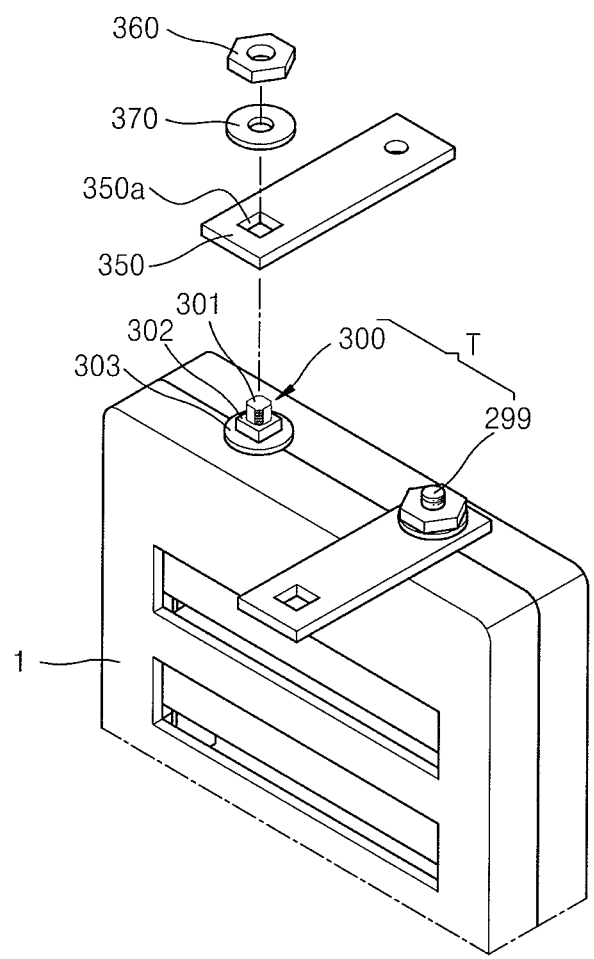
FIG. 4 is an exploded perspective view of a modified battery unit module of FIG. 1 being combined to a bus bar.

The positive electrode terminal 100 of FIG. 2 is described more fully with reference to FIGS. 3A through 3C. Here, the embodiment illustrated in FIGS. 3A through 3C is not limited to the positive electrode terminal 100 and the negative electrode terminal 99 may be applied thereto. The positive electrode terminal 100 may include a joint member 101, a modeling member 102, a contact member 103, and a connection member 104. The connection member 104 may be electrically connected to the secondary batteries 11 and penetrate the unit case 10. The contact member 103 may be formed on one side of the connection member 104 and at least part of a surface thereof may contact the bus bar 150. The contact member 103 may have larger cross-sections than cross-sections of the connection member 104, minimize electric resistance through increased surface contact with the bus bar 150, and be electrically connected to the secondary batteries 11. Also, the modeling member 102 may be formed on one side of the contact member 103 and may have cross-section different from the cross-section of a modeling member of the negative electrode terminal 99. That is, the cross-section of a modeling member 92 of the negative electrode terminal 99 may be different from the cross-section of the modeling member 102 of the positive electrode terminal 100. The joint member 101 may be formed on one side of the modeling member 102, penetrate a hole 150a of the bus bar 150, and connect to a nut 160 via a first screw thread 101a formed on an outer surface of the joint member 101. The cross-sections of the joint member 101 of the positive electrode terminal 100 may be different from the cross-section of a joint member 91 of the negative electrode terminal 99. Also, as illustrated in FIG. 3A, the first screw thread 101a may be formed on the outer surface of the joint member 101 in correspondence to a nut groove 160a of the nut 160. The first screw thread 101a may be formed on an outer part of the cross-section of the joint member 101 in correspondence to the nut groove 160a of the nut 160. The cross-section of the joint member 91 and the modeling member 92, or the cross-section of the joint member 101 and the modeling member 102 are not limited to being triangular, as illustrated in FIG. 4. It would have been obvious to one of ordinary skill in the art to form the joint member 91 and the modeling member 92, or the joint member 101 and the modeling member 102, to have cross-sections having any of various forms, such as a polygon form, a star form, or forms including a curved surface.

The electrode terminal T may be electrically connected to the electrode terminal T of an adjacent battery unit module 1 through the bus bar 150. The electrode terminal T may be inserted through the hole 150a of the bus bar 150 and a washer 170 and then a nut 160 may be coupled to the electrode terminal T over the washer 170.

The bus bar 150 may be connected to one end of the electrode terminal T through the hole 150a. Here, the hole 150a of the bus bar 150 may have a form corresponding to the cross-sections of the modeling member 92 and the joint member 91, or the modeling member 102 and the joint member 101.

The washer 170 may include a penetration hole 170a having a size corresponding to the modeling member 102 or the joint member 101.

The connection member 104, the contact member 103, the modeling member 102, and the joint member 101 are separately described. However, the elements may be formed as one body in other embodiments.

Here, in at least one of the positive electrode terminal 100 and the negative electrode terminal 99, the modeling member 92 or 102 may be respectively the same as the joint members 91 or 101. For example, referring to FIG. 2, the modeling member 92 and the joint member 91 of the negative electrode terminal 99 may have the same cross-sections and a first screw thread may be continuously formed across the modeling member 92 and the member 91.

Figure 5A:
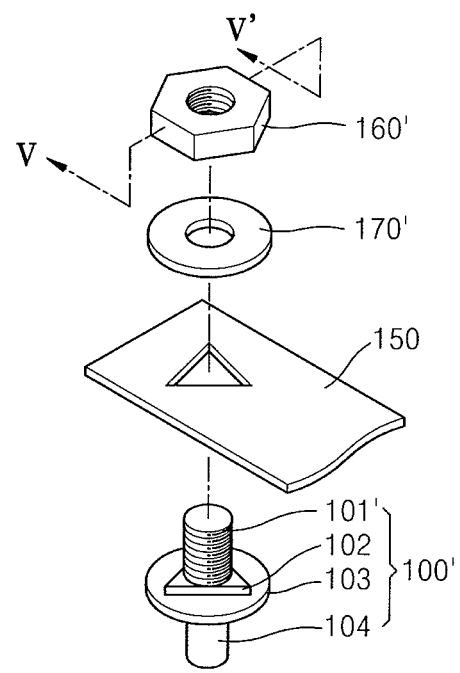
FIG. 5A is an exploded perspective view schematically illustrating a positive electrode terminal combined to a bus bar according to another embodiment of the present invention.
Figure 5B:
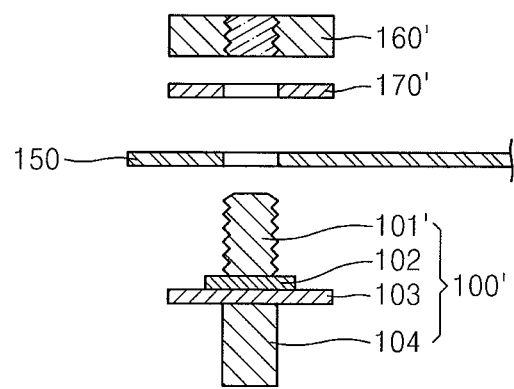
FIG. 5B is a cross-sectional view of FIG. 5A cut along a line V-V' of FIG. 5A.

The embodiment illustrated in FIG. 3A may be modified and descriptions in regards to the modification will be explained with reference to FIGS. 5A and 5B. FIG. 5A is an exploded perspective view schematically illustrating a positive electrode terminal 100' combined to the bus bar 150 according to another embodiment of the present invention. FIG. 5B is a cross-sectional view of FIG. 5A cut along a line V-V' of FIG. 5A. Here, a joint member 101' may be a circular bolt joint member. The joint member 101' may be connected to a nut 160' that corresponds to the inside diameter of the joint member 101' and a washer 170' may be connected to the joint member 101'. The surface of the contact member 103 may contact the bus bar 150 and thus may be electrically connected to the bus bar 150.

Figure 6A:
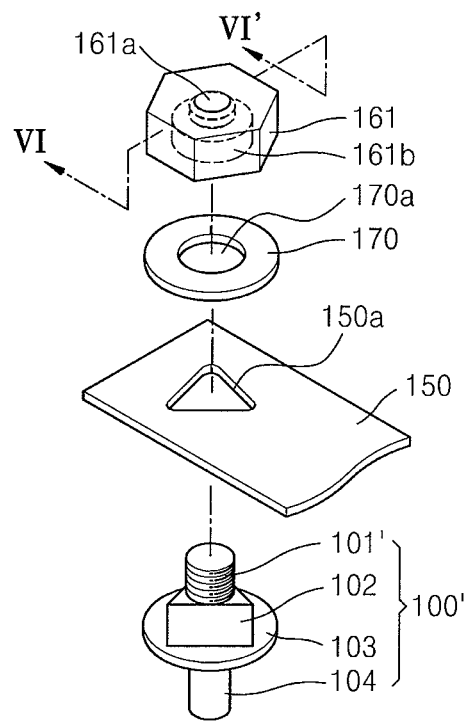
FIG. 6A is an exploded perspective view schematically illustrating an electrode terminal combined to a bus bar according to another embodiment of the present invention.
Figure 6B:
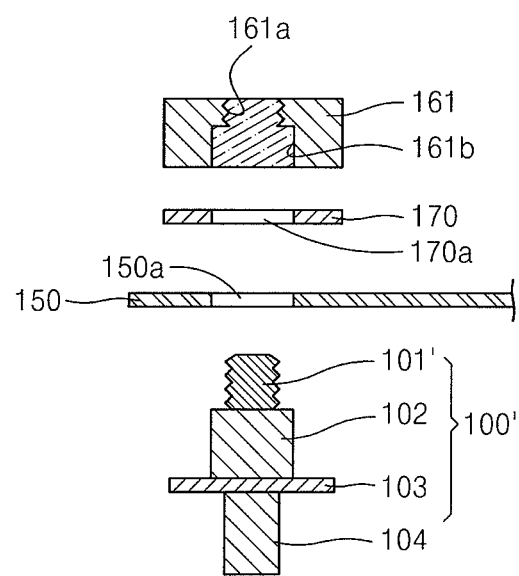
FIG. 6B is a cross-sectional view of FIG. 6A cut along the line VI-VI' of FIG. 6A.

The embodiment illustrated in FIG. 5A may be modified and descriptions in regards to the modification will be explained with reference to FIGS. 6A and 6B. FIG. 6A is an exploded perspective view schematically illustrating an electrode terminal 100' combined to the bus bar 150 according to another embodiment of the present invention. FIG. 6B is a cross-sectional view of FIG. 6A cut along a line VI-VI' of FIG. 6A. Here, the joint member 101' may be a circular bolt joint member. As a screw thread is formed on an outer surface of the joint member 101', a first screw thread 161a may be formed on an inside surface of a nut 161 in correspondence to the screw thread formed on the outer surface of the joint member 101'. A space 161b may be formed in a lower part of the nut 161 to accommodate the modeling member 102.

Figure 7A:
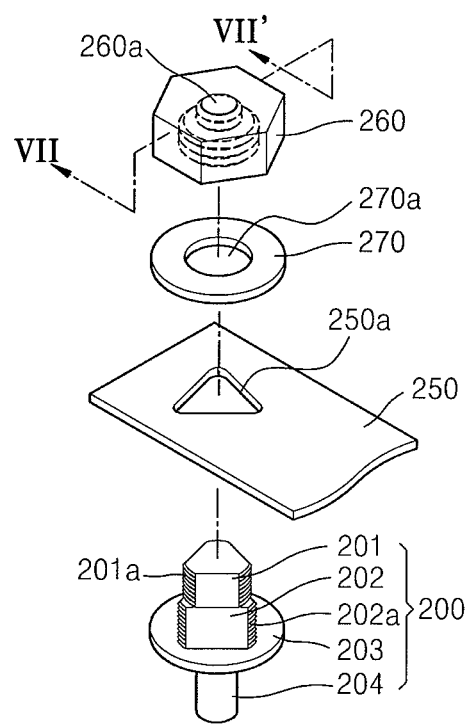
FIG. 7A is an exploded perspective view schematically illustrating an electrode terminal combined to a bus bar according to another embodiment of the present invention.
Figure 7B:
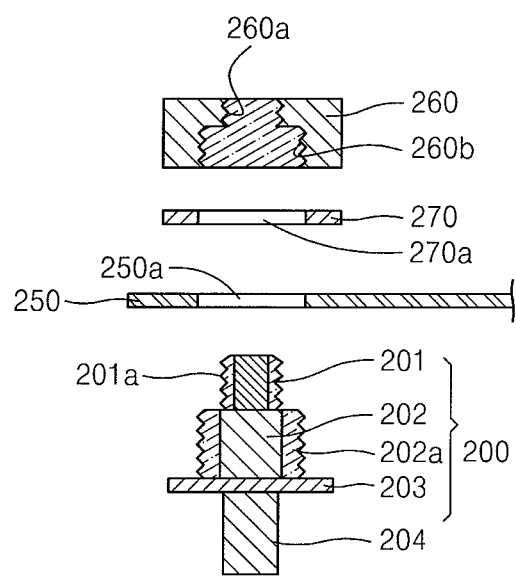
FIG. 7B is a cross-sectional view of FIG. 7A cut along a line VII-VII' of FIG. 7A.
Figure 7C:
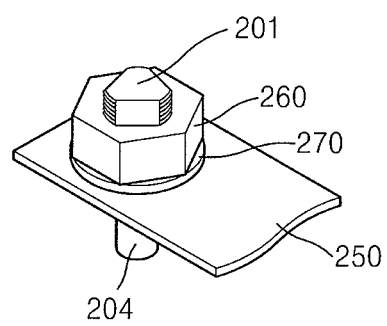
FIG. 7C is a perspective view of the electrode terminal and the bus bar of FIG. 7A in a combined state.

A modification to the electrode terminal T of FIG. 1 will be described with reference to FIGS. 7A through 7C. FIG. 7A is an exploded perspective view schematically illustrating the electrode terminal T 200 combined to a bus bar 250 according to another embodiment of the present invention. FIG. 7B is a cross-sectional view of FIG. 7A cut along a line VII-VII' of FIG. 7A. FIG. 7C is a perspective view of the electrode terminal T 200 and the bus bar 250 of FIG. 7A in a combined state. Referring to FIGS. 7A through 7C, a second screw thread 202a may be formed on an outer surface of a modeling member 202. A first screw thread 201a may be formed on an outer surface of a joint member 201, and a first screw thread 260a and a second screw thread 260b may be formed on an inside surface of a nut 260 in correspondence to the first screw thread 201a and the second screw thread 202a. Although it is illustrated in FIG. 7A that screw threads are formed on the outer surfaces of the modeling member 202 and the joint member 201, the current embodiment of the present invention is not limited thereto. A screw thread may be formed on the outer surface of any one of the modeling member 202 and the joint member 201. For example, a screw thread may be only formed on the modeling member 202 and not formed on the joint member 201. Likewise, a screw thread may be only formed on the joint member 201 and not formed on the modeling member 202. Alternatively, a screw thread may be formed on both the modeling member 202 and the joint member 201. Moreover, the nut 260 may include a nut groove in the inside surface thereof in correspondence to screw threads formed on the modeling member 202 and the joint member 201.

Figure 8A:
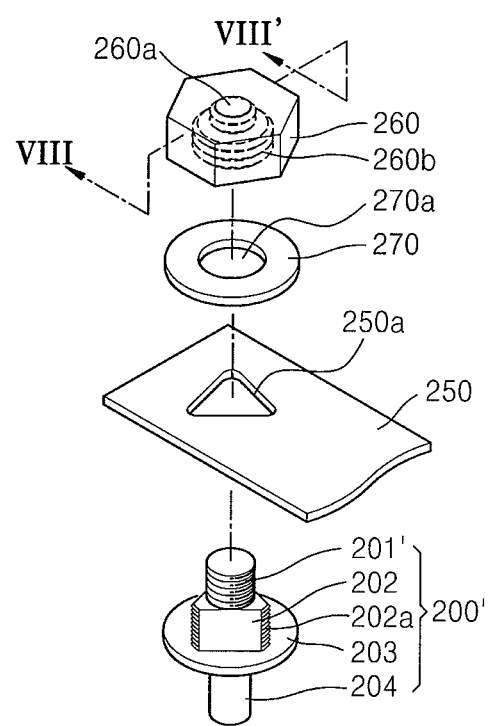
FIG. 8A is an exploded perspective view schematically illustrating an electrode terminal being to a bus bar according to another embodiment of the present invention.
Figure 8B:
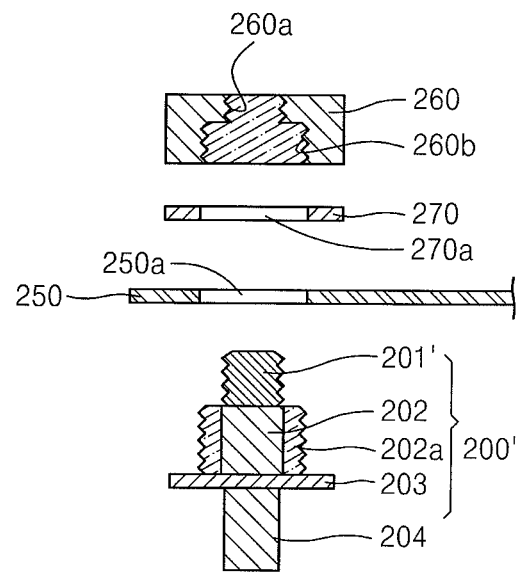
FIG. 8B is a cross-sectional view of FIG. 8A cut along a line VIII-VIII' of FIG. 8A.
Figure 8C:
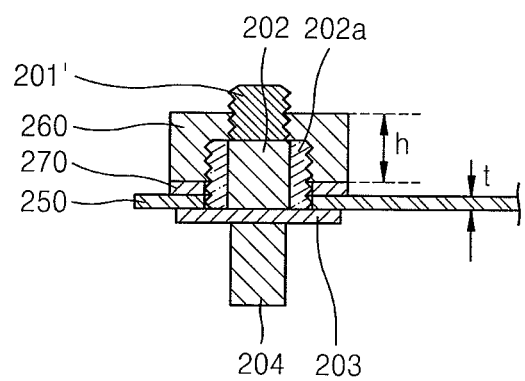
FIG. 8C is a perspective view of the electrode terminal and the bus bar of FIG. 8A in a combined state.

The embodiment illustrated in FIG. 7A may be modified and descriptions in regards to the modification will be explained with reference to FIGS. 8A and 8B. FIG. 8A is an exploded perspective view schematically illustrating an electrode terminal 200' combined to the bus bar 250 according to another embodiment of the present invention. FIG. 8B is a cross-sectional view of FIG. 8A cut along a line VIII-VIII' of FIG. 8A. The embodiment illustrated in FIGS. 8A and 8B is similar to the embodiment of FIGS. 7A and 7B, except that a joint member 201' may have a circular form. The first screw thread 260a of the nut 260 may be determined according to a radius of the joint member 201'. In FIG. 8C, a height h of the nut 260 may not need to cover the entire modeling member 202 and may cover the modeling member 202 except for a thickness t of the bus bar 250 so as to connect the bus bar 250.

Figure 9A:
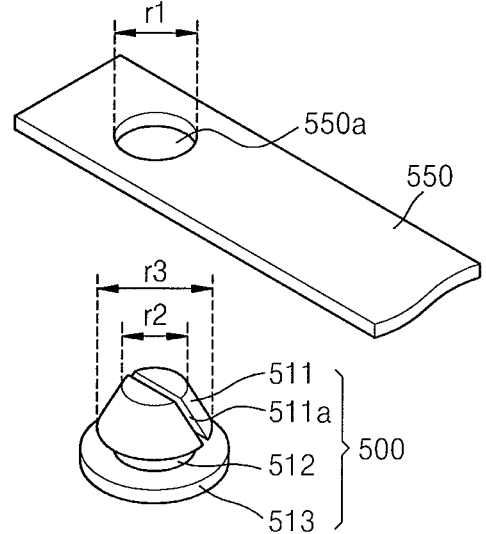
FIG. 9A is an exploded perspective view schematically illustrating an electrode terminal being to a bus bar according to another embodiment of the present invention.
Figure 9B:
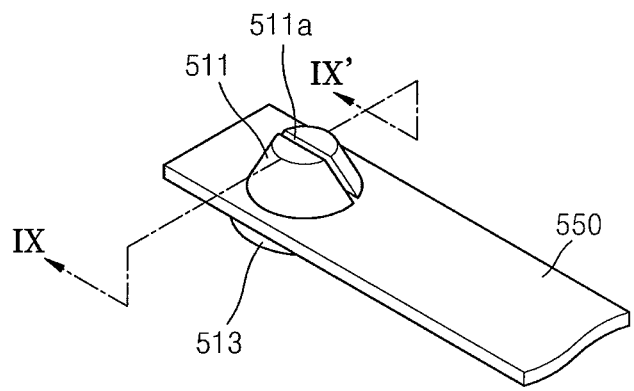
FIG. 9B is a perspective view of the electrode terminal and the bus bar of FIG. 9A in a combined state.
Figure 9C:
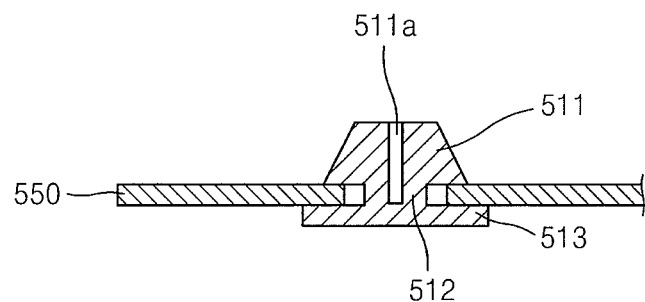
FIG. 9C is a cross-sectional view of FIG. 9B cut along a line IV-IV' of FIG. 9B.
Figure 10A:
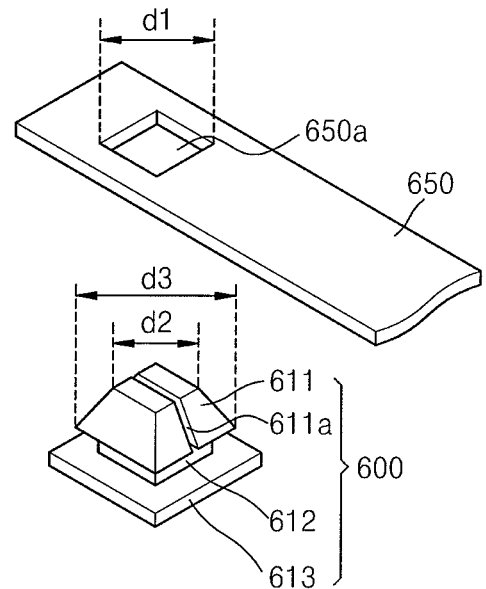
FIG. 10A is an exploded perspective view schematically illustrating an electrode terminal combined to a bus bar according to another embodiment of the present invention.
Figure 10B:
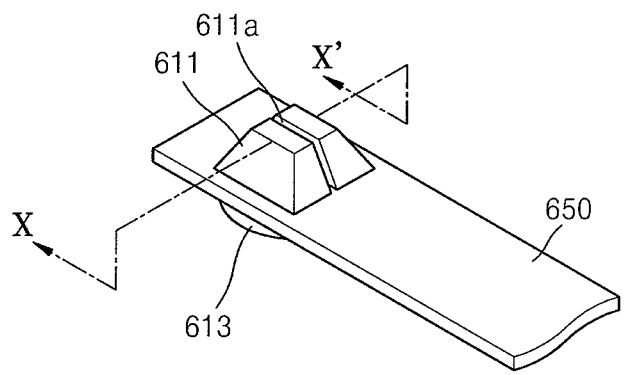
FIG. 10B is a perspective view of the electrode terminal and the bus bar of FIG. 10A in a combined state.
Figure 10C:
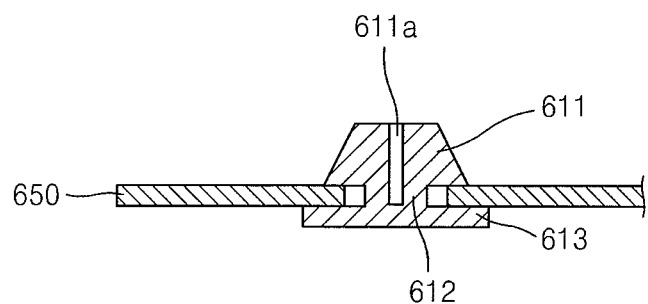
FIG. 10C is a cross-sectional view of FIG. 10B cut along a line X-X' of FIG. 10B.

Other embodiments of the present invention are described with reference to FIGS. 9A through 9C and FIGS. 10A through 10C. FIG. 9A is an exploded perspective view schematically illustrating the electrode terminal T 500 combined to a bus bar 550 according to another embodiment of the present invention. FIG. 9B is a perspective view of the electrode terminal T 500 and the bus bar 550 of FIG. 9A in a combined state. FIG. 9C is a cross-sectional view of FIG. 9B cut along a line IX-IX' of FIG. 9B. FIG. 10A is an exploded perspective view schematically illustrating the electrode terminal T 600 combined to the bus bar 650 according to another embodiment of the present invention. FIG. 10B is a perspective view of the electrode terminal T and the bus bar 650 of FIG. 10A. FIG. 10C is a cross-sectional view of FIG. 10B cut along a line X-X' of FIG. 10B.

Referring to FIGS. 9A through 9C and FIGS. 10A through 10C, electrode terminals 500 and 600 may include connection members (not illustrated), contact members 513 and 613, body members 512 and 612, and fixing members 511 and 611, respectively. The connection members (not illustrated) are electrically connected to the secondary batteries 11 and penetrate the unit case 10. The contact members 513 and 613 are formed on one side of the connection members and at least parts of surfaces thereof contact bus bars 550 and 650, respectively. The body members 512 and 612 are formed on one side of the contact members 513 and 613, respectively, and cross-sections of the body members 512 and 612 may be smaller than those of the contact members 513 and 613. The fixing members 511 and 611 have larger cross-sections than those of the body members 512 and 612, respectively, and may be formed on one side of the body members 512 and 612, respectively. Here, in a positive electrode terminal and a negative electrode terminal, the cross-sections of the fixing members 511 and 611 are different from each other. The fixing members 511 and 611 may include controlling grooves 511a and 611a, respectively, tapered in a longitudinal direction and through which cross-sections of the fixing member 511 and 611 may be changed.

According to embodiments, the connection member (not illustrated), the contact members 513 and 613, the body members 512 and 612, and the fixing members 511 and 611 may be formed as one body.

Holes 550a and 650a formed on the bus bars 550 and 650, respectively, may have forms corresponding to the cross-sections of the fixing members 511 and 611. The cross-sections of the holes 550a and 650a of the bus bars 550 and 650 may be smaller than the largest cross-sections of the fixing members 511 and 611, respectively, so that the fixing members 511 and 611 can be forcibly engaged to the holes 550a and 650a of the bus bars 550 and 650, respectively. That is, when the fixing members 511 and 611 are fixed to the bus bars 550 and 650, respectively, the cross-sections of the fixing members 511 and 611 may be flexibly reduced through the controlling grooves 511a and 611a of the fixing members 511 and 611, respectively. Thus, the bus bars 550 and 650 may be connected to the electrode terminals 500 and 600, respectively. Accordingly, because the electrode terminal T can include the fixing members 511 and 611, a screw connection is not necessary and additional processes for screwing a nut may be reduced.

According to embodiments, the cross-sections of the fixing members 511 and 611 may be formed so that the positive electrode terminal and the negative electrode terminal are asymmetrical with respect to each other. For example, the cross-section of the fixing member 511 may be circular, as illustrated in FIG. 9A, and the cross-section of the fixing member 611 may be square shaped, as illustrated in FIG. 10A. Thus, the fixing members 511 and 611 may be connected to the bus bars 550 and 650 according to the form of the electrode terminal T.

According to embodiments, the cross-sections of the holes 550a and 650a of the bus bars 550 and 650 may be smaller than the cross-sections of the contact members 513 and 613, respectively. Thus, when the fixing members 511 and 611 are forcibly engaged to the holes 550a and 650a of the bus bars 550 and 650, the bus bars 550 and 650 may be interposed between the contact members 513 and 613 and the fixing members 511 and 611, respectively.

Such a battery unit module may be applied to an uninterruptible power supply (UPS) module unit.

Figure 11:
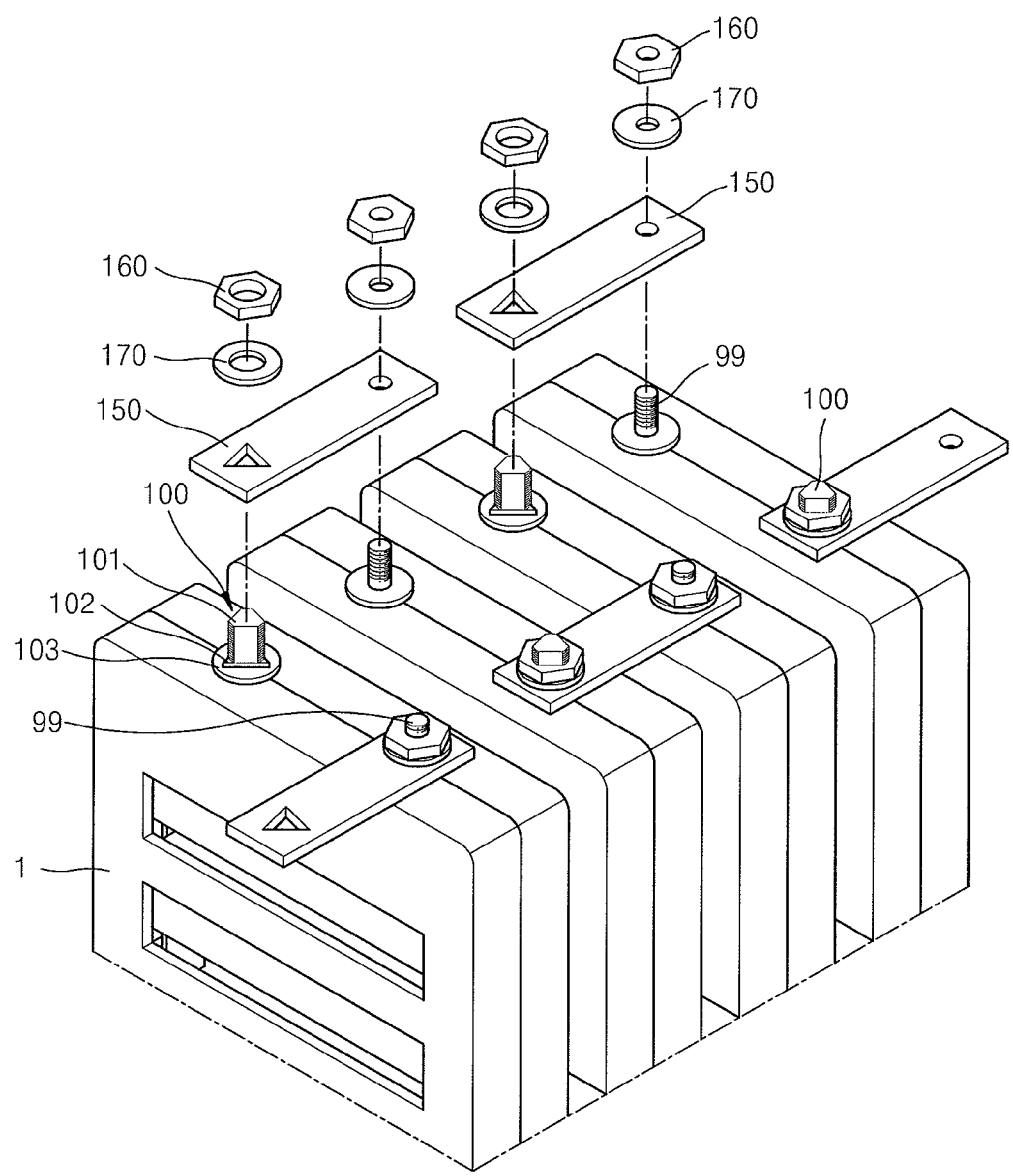
FIG. 11 is an exploded perspective view illustrating a battery module package combined to a bus bar according to an embodiment of the present invention.

A battery module package according to an embodiment of the present invention is described with reference to FIG. 11. FIG. 11 is an exploded perspective view illustrating a battery module package combined to the bus bar 150. The battery module package may be formed by electrically combining a plurality of battery unit modules, for example, each of the plurality of battery unit modules may be the battery unit module of FIG. 1. The battery module package may include protection circuits. Referring to FIG. 11, adjacent electrode terminals T of the battery unit modules 1 may be alternately arranged and may be connected to each other by the bus bar 150. Here, improper insertion of a positive electrode and a negative electrode may be prevented due to the form of the hole 150a of the bus bar 150. In FIG. 11, the electrode terminals T of the battery unit module 1 are alternately arranged; however, the present embodiment is not limited thereto. For example, the battery unit module 1 may be disposed in such a way that the electrode terminals T adjacent to each other have the same polarities. That is, the positive electrode terminals 100 having triangular cross-sections may be adjacent to each other and arranged in a line, and the negative electrode terminals 99 having the same cross-sectional shape may also be adjacent to each other and arranged in a line. Here, the positive electrode terminals 100 may be connected to the bus bar 150 through the holes 150a formed on both sides of the bus bar 150 and formed to be triangular in correspondence to the cross-sections of the positive electrode terminal 100.

In FIG. 11, the object 2 is not illustrated; however, the battery unit module 1 may be inserted into or penetrate an insertion hole of the object 2 engraved in correspondence to the form of the electrode terminal T. Here, after the battery unit module 1 penetrates the object 2, the bus bar 150 may be connected to the electrode terminal T. Also, after the bus bar 150 is connected to the electrode terminal T, the battery unit module 1 may be inserted into the object 2. Such a battery module package may be applied to a UPS module unit.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A battery unit module comprising:
    a secondary battery;
    a unit case accommodating the secondary battery;
    a positive electrode terminal and a negative electrode terminal electrically coupled to the secondary battery and exposed outside of the unit case,
    wherein the positive electrode terminal and the negative electrode terminal have cross-sections that are asymmetrical with respect to each other, and wherein a securing means is formed on at least one of the positive electrode terminal and the negative electrode terminal; and
    a bus bar comprising a hole thereon coupled to one end of at least one of the positive electrode terminal and the negative electrode terminal,
    wherein the at least one of the positive electrode terminal and the negative electrode terminal comprises:
        a connection member electrically coupled to the secondary battery and penetrating the unit case;
        a contact member formed on one side of the connection member configured so that at least part of one surface of the contact member contacts the bus bar;
        a modeling member formed on one side of the contact member and having a cross-section different from the cross-section of the other terminal; and
        a joint member formed on one side of the modeling member, the joint member configured to penetrate through the hole of the bus bar and to connect with a nut the joint member having a cross-section different from the cross-section of the other terminal,
    wherein the securing means comprises a screw thread, and wherein the screw thread is formed on an outer surface of the joint member; and
    wherein the hole of the bus bar has a form corresponding to the cross-section of the modeling member.

2. The battery unit module of claim 1, wherein the hole of the bus bar has a form corresponding to the cross-section of the joint member.

3. The battery unit module of claim 1, wherein the connection member, the contact member, the modeling member, and the joint member are formed as one body.

4. The battery unit module of claim 1, wherein the cross-section of the modeling member is the same as the cross-section of the joint member, and the screw thread is continuously formed across the outer surface of the modeling member, in any one of the positive electrode terminal and the negative electrode terminal.

5. The battery unit module of claim 1, wherein a nut groove is formed on an inside surface of the nut in correspondence to the screw thread.

6. The battery unit module of claim 5, wherein the nut covers at least part of the modeling member.

7. The battery unit module of claim 5, wherein a space is formed on the inside surface of the nut in correspondence to the modeling member.

8. The battery unit module of claim 5, further comprising a washer comprising a penetration hole having a size equal to or larger than the outer surface of the modeling member or the joint member, wherein the washer is coupled to the electrode terminal and the nut.

9. The battery unit module of claim 1, wherein the cross-sections of the joint member and of the modeling member are asymmetrical with respect to each other.

10. The battery unit module of claim 1, wherein the cross-section of the joint member is circular.

11. The battery unit module of claim 1, wherein at least one of the positive electrode terminal and the negative electrode terminal comprises:
    a connection member electrically coupled to the secondary battery and penetrating the unit case;
    a contact member formed on one side of the connection member so that at least part of one surface of the contact member contacts the bus bar; and
    a body member formed on one side of the contact member and having a cross-section smaller than the cross-section of the contact member;
    wherein the securing means comprises a fixing member having a cross-section larger than the cross-section of the body member, wherein the fixing member is formed on one side of the body member, and has a cross-section different from the cross section of the other terminal, and wherein the fixing member comprises a controlling groove that is tapered in a longitudinal direction and that controls the size of the cross-section of the fixing member.

12. The battery unit module of claim 11, wherein the hole of the bus bar has a form corresponding to the cross-section of the fixing member.

13. The battery unit module of claim 12, wherein the hole of the bus bar has a cross-section that is smaller than the largest cross-section of the fixing member so that the fixing member is configured to be forcibly engaged to the hole of the bus bar.

14. The battery unit module of claim 13, wherein the cross-section of the hole of the bus bar is smaller than the cross-section of the contact member so that the bus bar is configured to be interposed between the contact member and the fixing member when the fixing member is forcibly engaged to the hole of the bus bar.

15. The battery unit module of claim 1, wherein the battery unit module is applied to an uninterruptible power supply (UPS) module unit.

16. A battery module package comprising:
a plurality of battery unit modules; and
a bus bar comprising a hole and electrically coupling the plurality of battery unit modules,
wherein at least one battery unit module in the plurality of battery unit modules comprises a secondary battery, a unit case accommodating the secondary battery, and a positive electrode terminal and a negative electrode terminal electrically coupled to the secondary battery and exposed outside of the unit case, wherein the positive electrode terminal and the negative electrode terminal have cross-sections that are asymmetrical with respect to each other, and wherein at least one of the positive electrode terminal and the negative electrode terminal comprises:
a connection member electrically coupled to the secondary battery and penetrating the unit case;
a contact member formed on one side of the connection member configured so that at least part of one surface of the contact member contacts the bus bar;
a modeling member formed on one side of the contact member and having a cross-section different from the cross-section of the other terminal, wherein the hole of the bus bar has a form corresponding to the cross-section of the modeling member; and
a joint member formed on one side of the modeling member, the joint member configured to penetrate through the hole of the bus bar and to connect with a nut, the joint member having a cross-section different from the cross-section of the other terminal, and wherein a securing means is formed on the at least one of the positive electrode terminal and the negative electrode terminal, wherein the securing means comprises a screw thread, and wherein the screw thread is formed on an outer surface of the joint member.

17. The battery module package of claim 16, wherein the hole of the bus bar has a form corresponding to the cross-section of the joint member.

18. The battery module package of claim 1, wherein the cross-sections of the positive electrode terminal and the negative electrode terminal have a circular, polygonal or star shape.

19. The battery module package of claim 1, wherein the cross-section of one of the positive electrode terminal and the negative electrode terminal has a circular shape, and the cross-section of the other one of the positive electrode terminal and the negative electrode terminal has a non-circular shape.

* * * * *